United States Patent

Durteste et al.

[15] 3,692,944

[45] Sept. 19, 1972

[54] SCANNING CIRCUITS

[72] Inventors: Bernard Pierre Durteste, Sevres; Michel Andre Robert Henrion, Boulogne, both of France; Jean-Pierre Le Corre, deceased, late of Sainte-Genevieve-Des-Bois, France by Yuette Marie Laurence Le Corre, administratrix

[73] Assignee: International Standard Electric Corporation, New York, N.Y. ; by said Durteste and Henrion

[22] Filed: March 31, 1970

[21] Appl. No.: 24,114

[30] Foreign Application Priority Data

March 31, 1969 France......................6909623

[52] U.S. Cl...............................................179/18 FF

[51] Int. Cl...............................................H04m 3/30

[58] Field of Search...........179/18 FF, 18 FG, 18 ES; 340/413

[56] References Cited

UNITED STATES PATENTS

| | | | |
|---|---|---|---|
| 3,349,188 | 10/1967 | Stirling et al. | 179/18 FF |
| 3,532,827 | 10/1970 | Ewin | 179/18 ES |
| 3,420,960 | 1/1969 | Jacoby et al. | 179/18 FG |
| 3,517,123 | 6/1970 | Harr et al. | 179/18 ES |
| 3,420,957 | 1/1969 | Ulrich | 179/18 ES |

*Primary Examiner*—William C. Cooper
*Assistant Examiner*—David L. Stewart
*Attorney*—C. Cornell Remsen, Jr., Walter J. Baum, Percy P. Lantzy, J. Warren Whitesel, Delbert P. Warner and James B. Raden

[57] ABSTRACT

Scanning circuits are provided in a time multiplex central switching exchange. Scanning involves detecting new calls, to which high priority is given, and also changes of state in previously received information. Two memories are used to store the results of scanning and each memory is divided into two parts, one for each priority level. The messages giving new calls and other changes are sent to the processor when requested by the processor.

5 Claims, 26 Drawing Figures

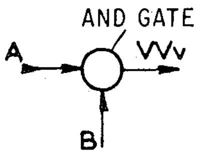
Fig.1.a
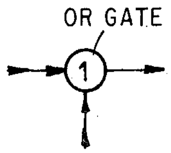
Fig.1.b
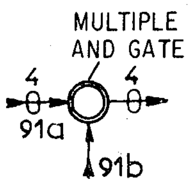
Fig.1.c
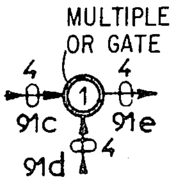
Fig.1.d
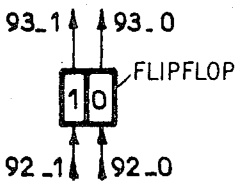
Fig.1.e
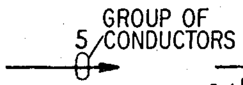
Fig.1.f
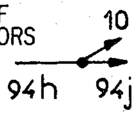
Fig.1.g
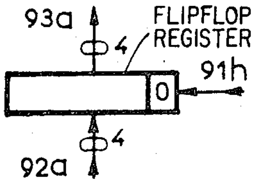
Fig.1.h
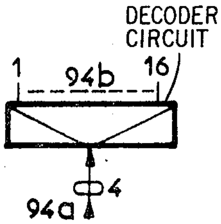
Fig.1.i
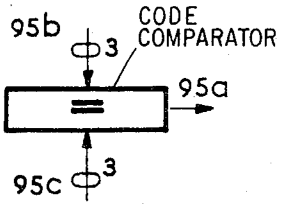
Fig.1.j
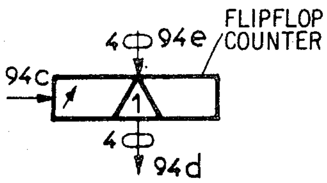
Fig.1.k
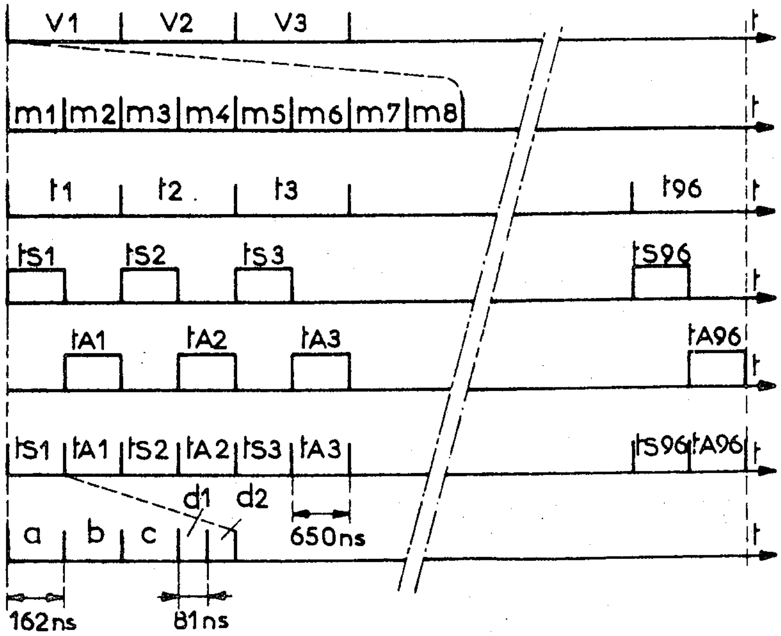
Fig.2.a, Fig.2.b, Fig.2.c, Fig.2.d, Fig.2.e, Fig.2.f, Fig.2.g
*Inventor*
B.P.J.DURTESTE-M.A.R.HENRION-
J.P.LE CORRE
*By* D.G.Warner
*Attorney*

SCANNING CIRCUITS

The present invention is related to scanning circuits and more particularly scanning circuits used in a time multiplex switching central exchange for detecting new calls and changes of stage of signalling other than new calls.

In the French Pat. No. 6,906,194 (J.G. Dupieux et al. 6-2-1-14), we have described circuits which enable to scan, for instance, the new calls, the said call is detected or after a cycle of scanning and is re-started only when the data processing machine which controls the switching central exchange sends a suitable instruction.

It is understood that such a way of operation which requires the intervention of the data processing machine after each new call or after each scanning cycle is not well adapted to a switching central exchange having a heavy traffic.

The object of the present invention is thus to make provision for scanning circuits in which the intervention of the data processing machine is considerably reduced.

In time multiplex data switching central exchange operating in pulse code modulation in which the operations are controlled by a data processing machine, the said switching central exchange comprising a switching network, circuits of group of $p$ trunks, if $p$ is the number of digits of each message of a channel, connected to the inlets of the switching network and provided for carrying out, on reception, a series-parallel conversion and, on transmission, a parallel-series conversion of the digits of messages of channels of $p$ trunks, detection and interpretation circuits of the signalling digits associated to each circuit of group of $p$ trunks comprising mainly a signalling memory in which are stored for each channel of the group the expected signalling state and the indication of the change or of the non-change of the signalling state according to the expected signalling state, junctor data memories connected to the outlets of the switching network, each junctor comprising, in addition to a data memory, a time path memory and space path memories provided for setting up a connection between two channels, the said memories being up dated by the data processing machine in relation with communications in course, a clock circuit provided for supplying cyclic signals, the scanning circuits which are the object of the present invention comprise means for cyclic reading of the signalling memories, means associated to each signalling memory enabling to detect, on the one hand, the new calls and, on the other hand, the changes of state of the others that the new calls, means for receiving selectively the signals coming from means associated to the signalling memories corresponding to a same switch, means for processing the signals received selectively from means associated to the signalling memories in order to find the time and space coordinates of a new call or of a change of state other than a new call, means for selecting successively the different groups of signalling memories corresponding each one to a same switch, memories for storing the space and time coordinates of the new calls and of the changes of state others that that new calls, a memory for storing the codes of masks supplied by the data processing machine, means for receiving and decoding the information sent by the data processing machine, selection means of the lines of the different memories for the reading or the writing means enabling, on the one hand, to scan completely all the channels connected to a same switch and, on the other hand, to stop the scanning at any time $t'x$ and to resume it at a time $t'x$ of another cycle, a sequential logical circuit elaborating the different signals of phase.

The invention can be used in telecommunication central exchanges.

The above mentioned and other features and objects of this invention will become apparent by reference to the following description taken in conjunction with the accompanying drawings in which:

FIGS. 1.*a* to 1.*k* represent the symbols used in the following figures;

FIGS. 2.*a* to 2.*g* represent the diagrams of the clock signals;

Figure 3:
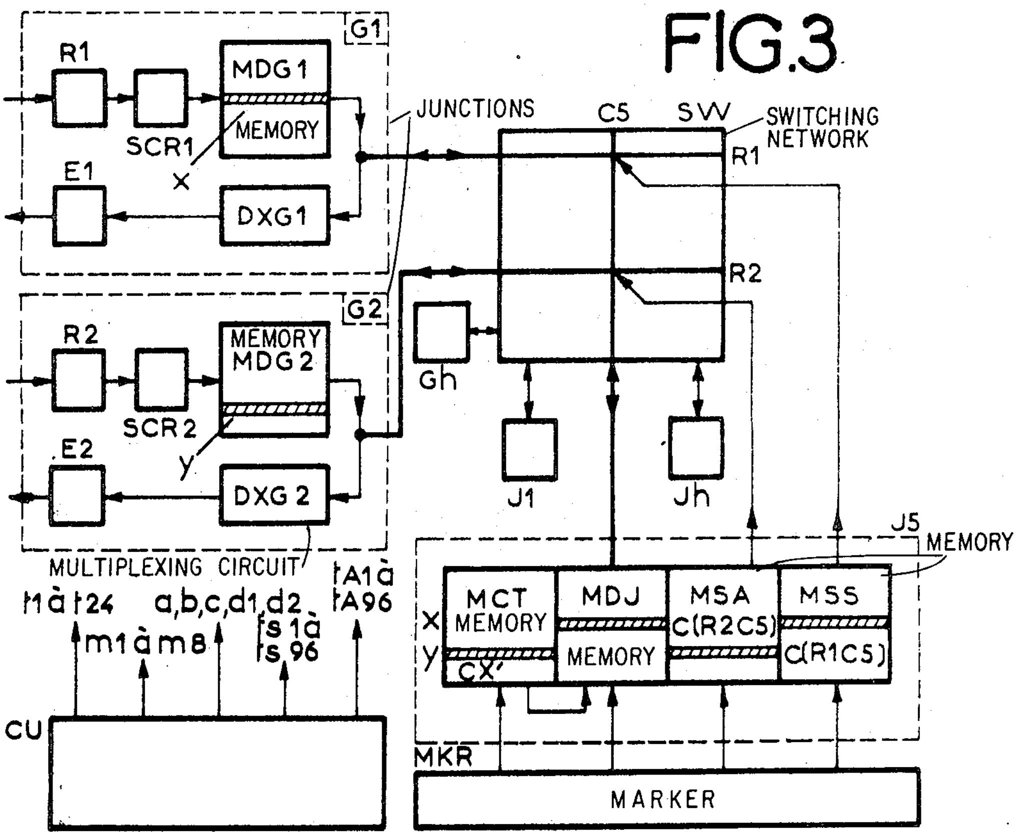
FIG. 3 represents the block diagram of a time multiplex switching central exchange operating in pulse code modulation.

FIGS. 1.*a* to 1.*k* give the meaning of certain symbols used particularly in the drawings of the present patent:

FIG. 1.*a* illustrates a coincidence electronic gate called simple AND circuit, which supplies a positive signal on its output when its inputs, represented by arrows touching the circle, receive simultaneously a positive signal. If we call A and B the signals which are present on each one of the two input terminals, this circuit achieves the logical condition noted A.B.

FIG. 1.*b* illustrates a mixing electronic gate, called OR circuit, which supplies a positive signal on its output when a positive signal is applied at least on one of the input terminals represented by the arrows touching the circle. If one calls C and D the signals which are present on each one of the two input terminals, this circuit achieves the logical condition noted C+D.

FIG. 1.*c* illustrates a multiple AND circuit, i.e., comprising, in the case of the example, four AND circuits one of the input terminals of which is connected to each one of the conductors **91*a* and the second input terminal of which is connected to a common conductor 91*b***.

An input of a AND circuit will be said to be activated or energized when a signal is applied on the said input and that the AND circuit is conductive if all its inputs are simultaneously activated.

FIG. 1.*d* illustrates a multiple OR circuit which comprises in the case of the example four OR circuits having two inputs 91*c* and 91*d* and which delivers, over the four output terminals 91*e* the same signals as those applied over said input terminals.

FIG. 1.*e* illustrates a bistable circuit or "flip-flop" to which a control signal is applied on one of its inputs 92-1 or 92-0 in order to set it respectively to the 1 state or to the 0 state. A voltage of the same polarity as the control signals is present, either on the output 93-1 when the flipflop is in the 1 state, or on the output 93-0 when it is in the 0 state. If the flipflop is referenced B1, the logical condition characterizing the fact that it is in the 1 state will be written B1, the one characterizing the fact that it is in the 0 state will be written $\overline{B1}$.

FIG. 1.*f* illustrates a g group of several conductors, five for the example considered.

FIG. 1.*g* illustrates a multiplexing of conductors so that, in the shown example, 10 output conductors 94*j* are connected in parallel to the same input conductor 94*h*.

FIG. 1.*h* illustrates a flipflop register. In the case of the figure, it comprises four flipflops the 1 inputs of which are connected to the conductors of group 92*a* and the 1 outputs of which are connected to the group of the conductors 93*a*. The digit 0 located at one end of the register means that this latter is reset or clear when a signal is applied to the conductor 91*h*.

FIG. 1.*i* illustrates a decoder circuit which, in the shown example, converts a four-digit binary code group applied over the group of conductors 94*a* into a 1 out of 16 codes so that a signal appears on only one among the 16 conductors 94*b* for each one of the code group applied to the input.

FIG. 1.*j* illustrates a code comparator which delivers a signal over its output terminal 95*a* when the three-digit code groups applied over its terminals 95*b* and 95*c* are identical.

FIG. 1.*k* represents a four flipflop counter which counts the pulses applied to its input terminal 94*c*. The group of conductors 94*e* allows to control the states of the four flipflops in order to obtain a particular code. The outputs 1 of the flipflops are connected to output conductors 94*d*.

In the course of the description, it will be used frequently the reference of a signal preceded by the letter C in order to designate the binary code the decoding of which supplies the said signal. Thus CSG1 designates the code to which corresponds the signal SG1.

Last, it will be noted, that in the different figures enclosed to the description, the electronic gates (AND circuits, OR circuits) do not bear references. In fact, each one of these gates is identified without ambiguity in the description, by the logical equation describing the function it performs and by the number of the figure, the reference of each elementary signal applied to it being shown near the corresponding input. Thus, the AND circuit of FIG. 1.*a* would be defined as the logical circuit supplying a signal Wv for the logical condition A.B (FIG. 1.*a*).

Besides, the logical circuits (AND circuits, OR circuits) which perform the logical functions of certain circuits have not been shown, but the logical equations describing the said functions of one circuit are given in a table. A logical function will be thus designated by its logical equation and by the table in which it is given.

FIGS. 2.*a* to 2.*g* represent the diagrams of the clock signals of the PCM central exchange and the table 1 gives the definition of them.

In the course of the description cases will be mentioned ; these cases are listed below and will be mentioned in the description by the lettered reference of the said list;

a. French Pat. No. 6,901,888 (J.G. Dupieux et al. 5-1-13-1)

b. French Pat. No. 6,904,113 (B.P.J. Durteste et al. 1-2-2)

c. French Pat. No. 6,906,194 (J.G. Dupieux et al. 6-2-1-14)

A way of achievement of a time multiplex data switching central exchange and more particularly a central exchange of this type operating in pulse code modulation or PCM, has been described in the case (a).

This improved switching central exchange comprises (FIG. 3) :

- a switching network SW shown under a matrix form and comprising for example h rows R and h columns C. Only the rows R1, R2 and the column C5 have been shown on the figure and the corresponding cross-points have been referenced R1C5 and R2C5.
- *h* circuits of group of junctions G1 to G*h;*
- *h* junctors J1 to J*h;*
- a marker circuit MKR having access to all the junctors;
- a clock unit CU which supplies the signals defined in Table 1 and the FIGS. 2.*a* to 2.*g*.

Each junctions group circuit such as G1 comprises:

- a receiving circuit R1 to the messages received over $p=8$ incoming lines;
- a synchronization circuit SCR1 ;
- a group data memory MDG1 comprising $g=p\times m=192$ lines ; this memory is selected on a cyclic way under the control of the signals tS ;
- a demultiplexing circuit DXG1 of the messages coming from the switch SW ;
- a transmission circuit E1 of the messages to which are connected $p=8$ outgoing lines;

Each junctor such as J5 comprises mainly a certain number of memories of $g/2=96$ lines, which are :

TABLE 1

Characteristics of the PCM system and of the clock signals (exchange time base HS)

| Symbol | unit duration | cycle duration | | Figure |
|---|---|---|---|---|
| TR | 125 μs | | Duration of the repetition period or frame (sampling frequency : 8kc) | 2.*a* |
| m | | | Number of channels in a junction ($m=24$) | |
| V1, V2–V24 | ≈5,2 μs | 125 μs | Channel time slot | 2.*a* |
| P | | | Number of digits of a message and number of junctions in a group ($p=8$) | |
| *m*1, *m*2–*m*8 | 650 *ns* | 5,2 μs | Digit time slot | 2.*b* |
| *t*1–*t*96 | 1 300 *ns* | 125 μs | Base time slot | 2.*c* |
| *t*'1–*t*'96 | 650 *ns* | 125 μs | Half base time slot | |
| Ct | | | Set of 96 base time-slot codes | |
| Ct' | | | Set of $g=192$ half base time slot codes | |
| *t*S | 650 ns | | Synchronous time slots | 2.*d* |
| *t*A | 650 *ns* | | Asynchronous time slots | 2.*e* |
| *t*S1–S96 | 650 *ns* | 125 μs | Interlaced sets of signals tS | |

| | | | | |
|---|---|---|---|---|
| tA1–AtA96 | 650 ns | 125 µs | and tA | 2.f |
| a, b, c, d | 162,5 ns | 650 ns | Fine time slot signals | 2.f |
| a1, a2 (d1, d2) | ≅81 ns | 162,5 ns | Ultra-fine time slot signals dividing a signal (d) into 2 equal time slots | 2.g |
| Ct.tS | | | Cyclical selection at synchronous time slots tS | |
| Ct.tA | | | Cyclical selection at asynchronous time slots tA | |

A speech memory MDJ;
a time path memory MCT ;
a synchronous space path memory MSS ;
an asynchronous space path memory MSA ;

The switching network of FIG. 3 is provided in order to establish connections between *h* groups of junctions G1 to G*h* comprising each one $g = 192$ channels, each connection being set up through a junction among *h*. Such a connection is constituted by two half-connections which connect respectively to the junctor the incoming channel and the outgoing channel; one of these half-connections being set-up at a synchronous time slot tS and the other one at an asynchronous time slot *t*A the order numbers of which being generally different. A connection necessitates the carrying out of a time switching in the junctor and of two space switchings (one per half-connection) in the switching network SW.

The time switch is constituted by the combination in a junctor of a speech memory MDJ and of a time path memory MCT. The addressing of the speech memory is carried out in a cyclic way under the control of the signals *t*S and in an acyclic way at the time *t*A under the control of the address code supplied by the time path memory MCT the selection of which is also cyclic.

The space switch is constituted by the switch SW with electronic cross-points controlled either by synchronous space path memories MSS when it is required to set up a synchronous half-connection, or by asynchronous space path memories MSA when it is required to set up an asynchronous half-connection. Such a switch enables to carry out the connection between groups of different junctions such as G1 and G2.

The time and space switchings will be quickly described for a connection between the channel *x* of the group G1 (half-connection G1:*t*S*x*) and the channel *y* (abbreviation of the connection G1:*t*S*x*/J5/G2:*t*A*y*).

The marker circuit MKR allocates to this connection the line *x* of the junctor J5 and writes on the line *y* of the memory MCT to code C*x* defining the address *x* of the memory MDJ. The marker circuit writes also in the line *x* of the synchronous space path memory MSS the code C(R1C5) permitting the selection in the switch SW of the cross-point R1C5. It writes also in the line *y* of the asynchronous space path memory MSA the code C(R2C5) permitting the selection in the switch SW of the cross-point R2C5.

At the time slot S*x*, the information contained in the lines *x* of the memories MDJ, MDG1 and MSS permits the setting up of the half-connection G1;*t*S*x*. This latter is made by a transfer in both directions of data between the junctor J5 and the group G1, vizus, first the transfer of information contained in the line *x* of the memory MDJ towards the demultiplexing circuit DXG1, afterwards the transfer of the contents of the line *x* of the memory MDG1 in the line *x* of the memory MDJ. It will be observed that two messages are written in each line of the memory MDG1, one of the messages is transferred during the synchronous time slot *t*S*x* (synchronous half-connection) and the other one is transferred during the asynchronous time slot *t*A*x* (asynchronous half-connection).

At the time slot *t*S*y*, the line *y* of the memory MCT is selected next and the code C*x* which is read controls again the selection at the time slot tA*y* of the line *x* of the memory MDJ; the line *y* of the memory MSA is also selected at the time slot tS*y* and the code C(R2C5) permits the closing at the time tA*y* of the cross-point R2C5 used for the half-connection G2:*t*A*y*. This latter consists first in a transfer of the contents of the line *x* of the memory MDJ in the multiplexing circuit DXG2 then in a transfer of a message of the line *y* of the memory MDG2 in the line *x* of the memory MDJ.

It is therefore seen that the time switch enables to match the time position of the incoming and of the outgoing channels by delaying the information received from G1 from the time slot *t*S*x* to the time slot *t*A*y* and by delaying the one received from G2 from the time slot tA*y* to the time slot *t*S*x*.

As it has been mentioned in relation to FIG. 3, the group data memory MDG is read in a cyclic way at $g/2 = 96$ synchronous time slots. But, this memory receives *g* messages per cycle TR, so that each reading must enable to read two messages. This group memory is organized in such a way as at each reading one has staticized on the output registers two messages corresponding the one to a channel of one odd junction and the other one to the homologous channel of an even junction. The message of a channel of an odd junction is processed during a synchronous time slot *t*S whereas the message of a channel of an even junction is processed during an asynchronous time slot *t*A.

Figure 4:
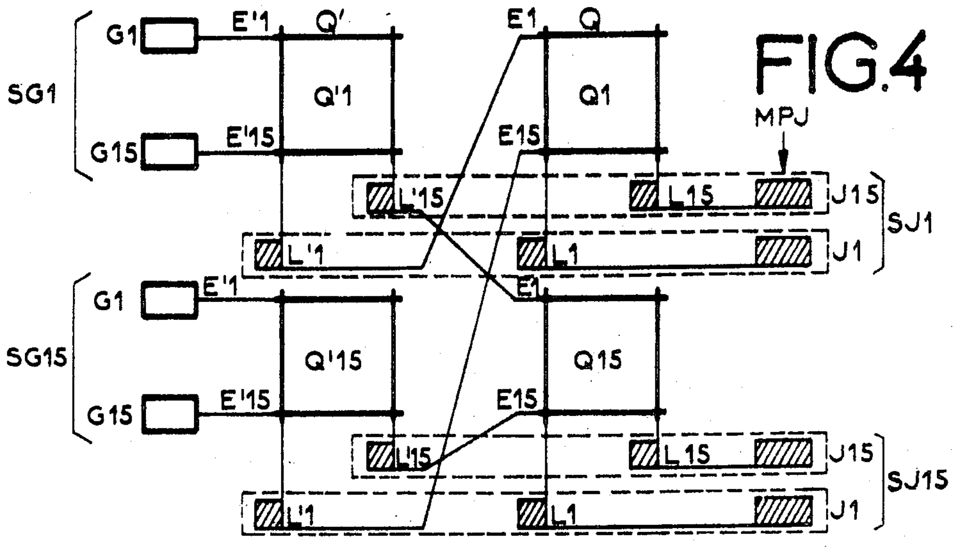
FIG. 4 represents the interconnection diagram between the two stages of a switching network.

The switching circuit of FIG. 3 comprises a switching network SW with a single stage. FIG. 4 represents a switching circuit which comprises a switching network with two stages Q and Q′, each stage having for example 15 switches with 15 inlets and 15 outlets. The outlets or verticals L′ of the first stage Q′ are connected to the inlets or horizontals E of the second stage Q in such a way as each switch of one stage may have access to all the switches of the other stage. The inlets or horizontals E′ of the stage Q′ are connected to the equipments of group G and the assembly of the group equipments which are connected to the same switch Q′ will be called supergroup SG. The outlets or verticals L of the stage Q are connected to the junctors J and the set of junctors which are connected to a switch Q will be called superjunctor SJ.

In the case (b), circuits enabling to detect the changes of state of the signalling signals of a group G of *p* trunks of *m* channels each have been described. These circuits comprise mainly a memory of $(p \times m/2)$ lines in which the information contained in a memory line enable to process the signalling of two channels of a group considered, vizus a channel of an odd trunk and a channel of an even trunk.

Figure 5:
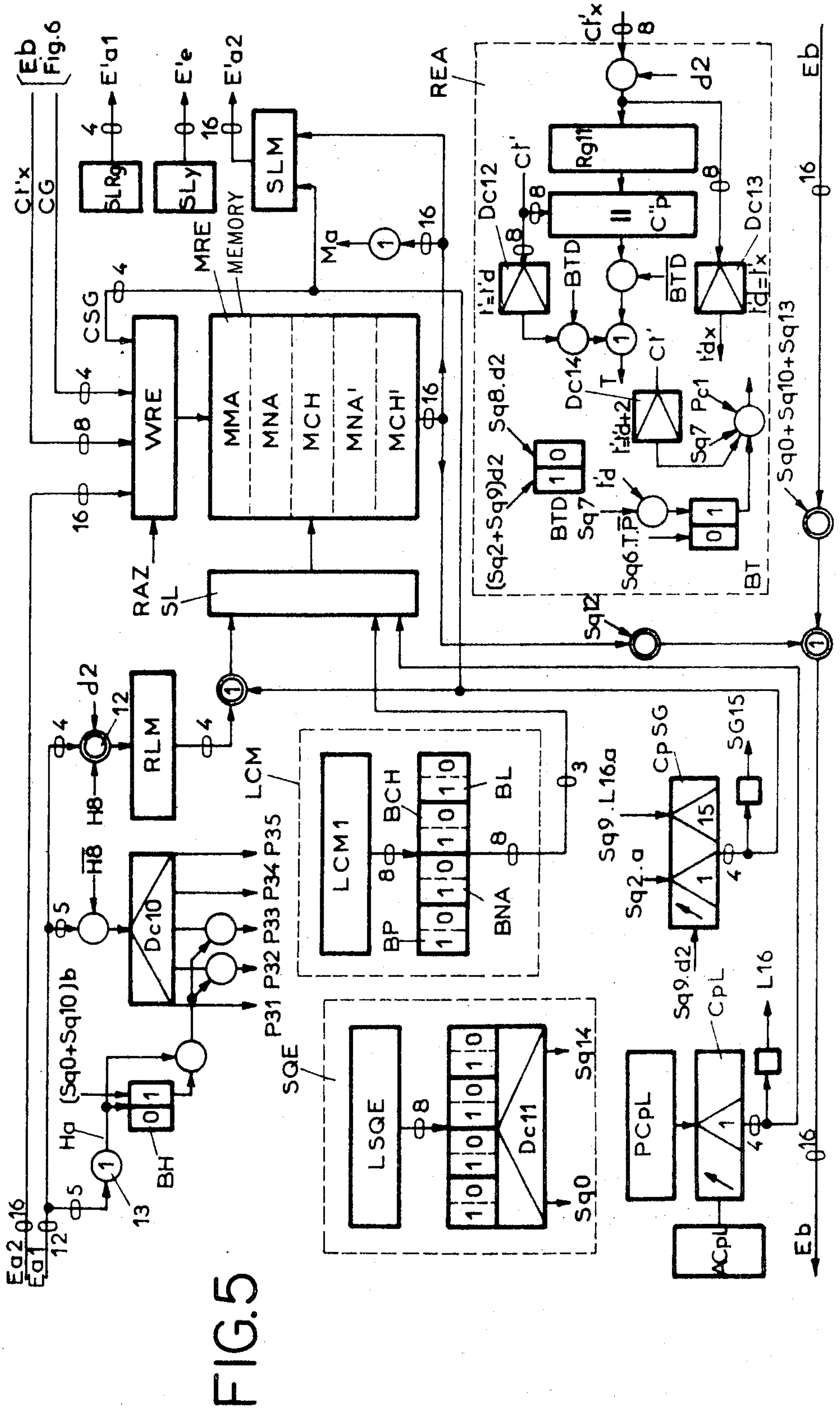
FIG. 5 represents the circuit object of the present invention.

In the case (c), circuits which enable to scan the signalling memories of the groups and to detect the new calls and the changes of state of the signalling others that the new calls have been described. This scanning circuit is stopped as soon as a complete scanning cycle has been carried out and is started again only when the data processing machine which controls the central exchange has given a new scanning order. It is understood that such a mode of operation which requires the frequency intervention of the data processing machine is not adapted to a switching central exchange having a heavy traffic; thus, provision is made for circuits which, associated to the circuits described in the case (c), enable to store several new calls and the other changes of state thus decreasing accordingly the interventions of the data processing machine. FIG. 5 represents the diagram of such circuits which comprise mainly a memory MRE in which are stored the information concerning the new calls and the other changes of state as well as the codes of masks of the groups of each supergroup, circuits enabling to scan successively the supergroups and to store in the memory MRE the information concerning the new claim or the other changes of state, circuits enabling to read, at the request of the data processing machine, the information contained in the memory MRE.

Before describing in detail the circuits of FIG. 5, the scanning circuits which have been the object of the case (c) will be briefly described in connection with FIGS. 6, 7, 8 and 9.

Figure 6:
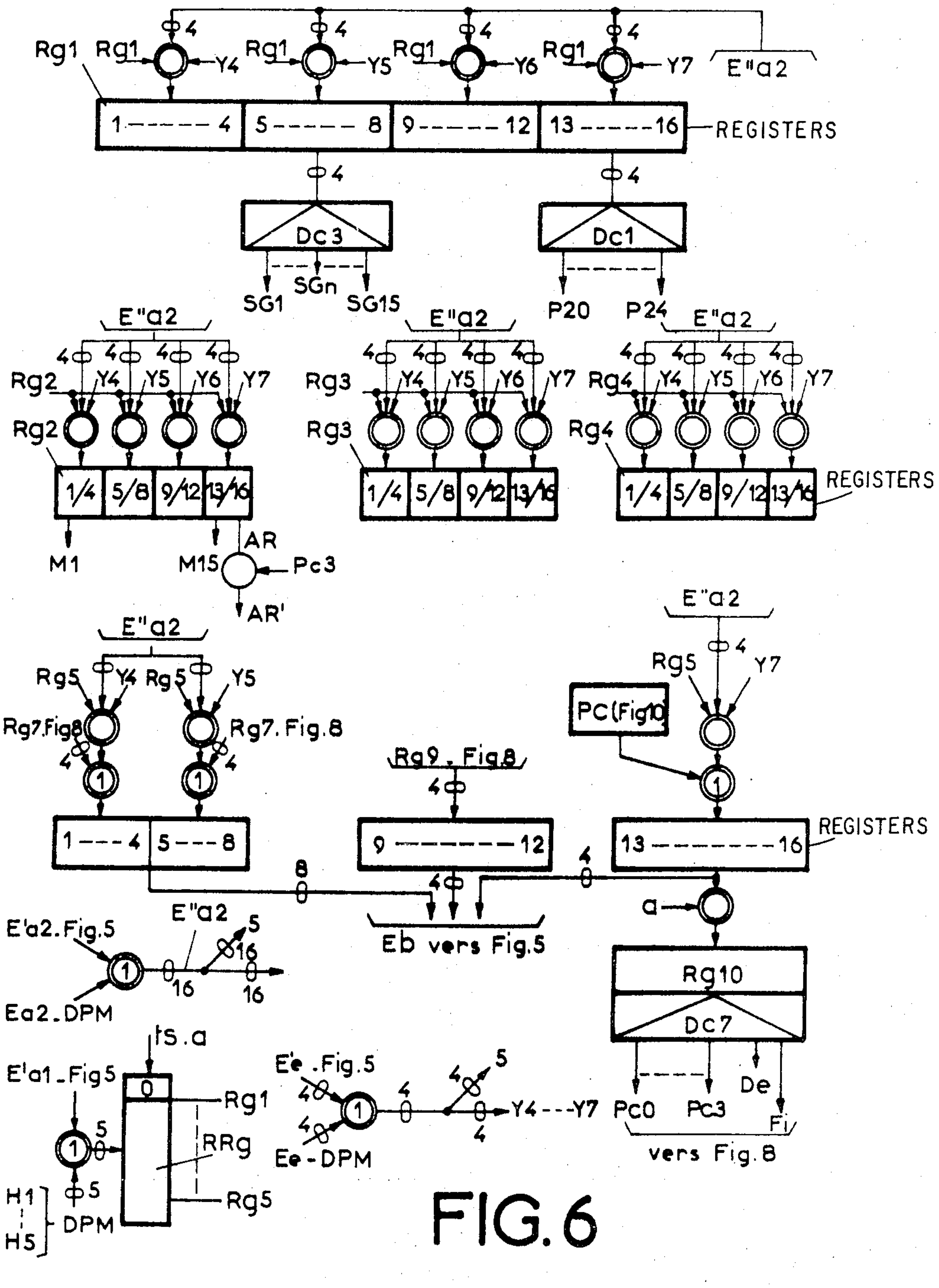
FIG. 6 represents the registers and their associated circuits which enable to control the scanning circuits.

FIG. 6 represents the registers Rg1 to Rg5 in which are staticized the five words which are necessary to operate the scanning and path search circuits. In effect, for a scanning, only the information contained in the registers R*g*1, R*g*2 and R*g*5 are necessary ; therefore, only these three registers and their associated circuits will be described. In order to fill one of the five registers, the data processing machine DPM sends, over the conductors H1 to H5 of the group of conductors Ea1, which comprises 12 conductors referenced H1 to H12, a code "1 out of 5" the position of the 1 digit of which indicates the selected register ; this code appears at a synchronous time slot *t*S and is then staticized in the register RR*g* of FIG. 6 at a synchronous time slot. At the following asynchronous time slot, the data processing machine DPM sends over the group of conductors Ee, the writing orders Y4 to Y7 of parts of word, the said signals Y4 to Y7 enable, in combination with the signals of 1 state of one of the flipflops of the register RR*g*, the writing of the word of 16 digits sent at this same asynchronous time slot by the data processing machine DPM over the group of conductors E*a*2. When a scanning is to be carried out, the information is elaborated by the circuit of FIG. 5, the said circuit elaborating in particular the signals Y4 to Y7 (group of conductors E'*e*) the selection signals of the registers (group of conductors E'*a*1) and the information signals (group of conductors E'*a*2).

The digits 13 to 16 of the register Rg1 correspond to the code of the program and the decoding circuit Dc1 which is associated to its supplies the program signals, vizus the signal P20 for the scanning program of the new calls and the signal P24 for the scanning program of the changes of state others that the new calls.

The digits 5 to 8 of the register R*g* 1 correspond to the code of the super group SG which is required to scan and the decoder circuit D*c*3 supplies then the selection signal SG1 to SG15 of one of the supergroups. In the circuit of the present invention, these four digits are supplied by the counter C*p*SG of FIG. 5.

The register Rg2 contains the mask code which enables not to take into account the changes of state detected in certain groups. In the description, it will be assumed that each supergroup comprises 15 groups so that the 16 digit of the register R*g*2 is available and is used in order to indicate whether the circuit of FIG. 5 may be warned that a change has just been detected. The code of mask is also supplied by the circuit of FIG. 5 before each scanning of a supergroup. The different codes of mask are stored in the memory MRE and are up dated by the data processing machine.

The digits 1 to 8 of the register R*g*5 give the time code of the scanning result, i.e., the code of the clock time during which the change of state has been detected. This code is supplied by the register *Rg*7 of the FIG. 8.

The digits 9 to 12 of the register R*g* 5 give the space code of the scanning result, i.e., the code of the group to which belongs the channel the change of state of which has just been detected. This code is supplied by the register Rg9 of FIG. 8.

The digits 13 to 16 of the register R*g*5 define the state of the sequential circuit PC which will be described in connection with FIG. 9. A scanning operation can only start if the sequential circuit PC receives the code 1 0 0 0 sent by the circuit of FIG. 5.

Since the "coordinates" of a new call or of a change of state are staticized in the register R*g*5, only this register will be read by sending a reading order accompanied by the selection code of the register Rg5 through the group of conductor E'*a*1.

Figure 7:
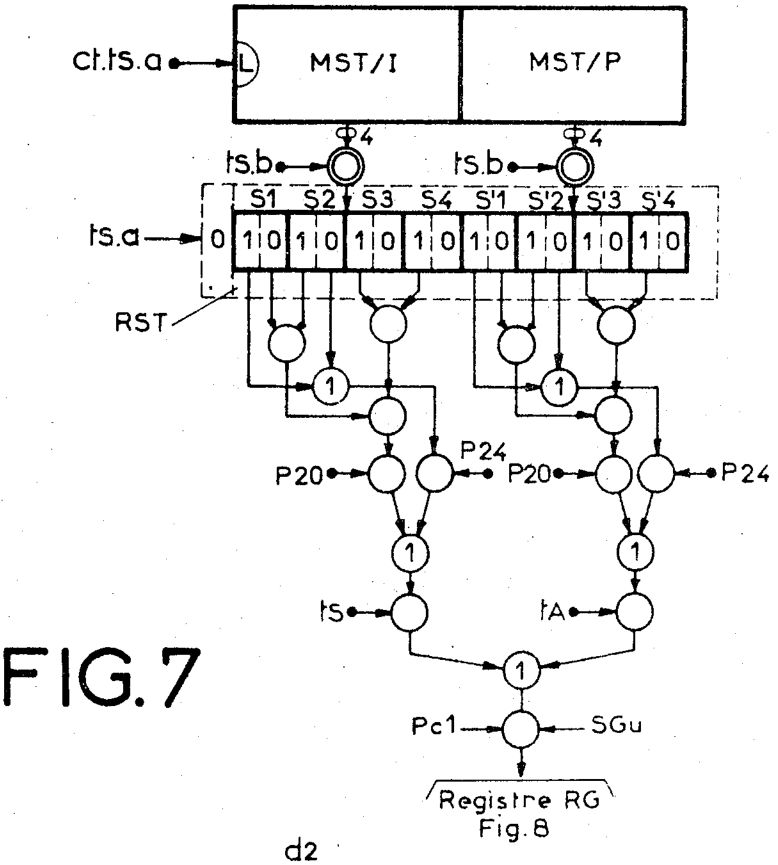
FIG. 7 represents the circuits associated to each group of trunks, the said circuits enabling to detect the new calls and the changes of state others than the new calls.

FIG. 7 illustrates the circuits associated to the signalling memories which have been described in the case (b). Each line of the signalling memory MST of the FIG. 7 comprises two seven-digit words referenced S1 to S7 for the odd trunks and S'1 to S'7 for the even trunks. The digits S1 and S2 (or S'1 and S'2) are reserved to the indication of the expected signalling state for example, the code 01 means that the expected state is the "free" state; the digits S3 and S4 (or S'3 and S'4) are reserved to the indication of the change of state in the signalling received, for instance the code 11 means that the signal received is different from the expected signal. The meaning of the three other digits S5 to S7 (or S'5 to S'7) will not be given since they play no role in the circuit offect of the present invention.

In the FIG. 7, we have only shown the flipflops S1 to S4 and S'1 to S'4 of the register RST in which are staticized at each synchronous time slot the contents of a line of the signalling memories MST/I for the odd trunks and MST/P for the even trunks. The new calls will be detected by the condition $\overline{S1}\cdot S2\cdot S3\cdot S4$ (or $\overline{S'1}\cdot S'2\cdot S'3\cdot S'4$) and the changes of state of the signalling which do not correspond to a new call will be detected by the condition $(S1+\overline{S2})S3\cdot S4$ or $(S'1+\overline{S'2})S'3\cdot S'4$ for the even trunks. These logical signals appear at the beginning of each synchronous time slot *t*S in all the group circuits of the central exchange but are taken into account only in the case of simultaneous presence of the signal of the program P24 (change of state) or P20 (new calls), of the signal *t*S in the case of an odd trunk and of the signal *t*A in the case of an even trunk, of the signal of selection SGu of the supergroup and of the signal of the first phase Pc1 of the program.

Figure 8:
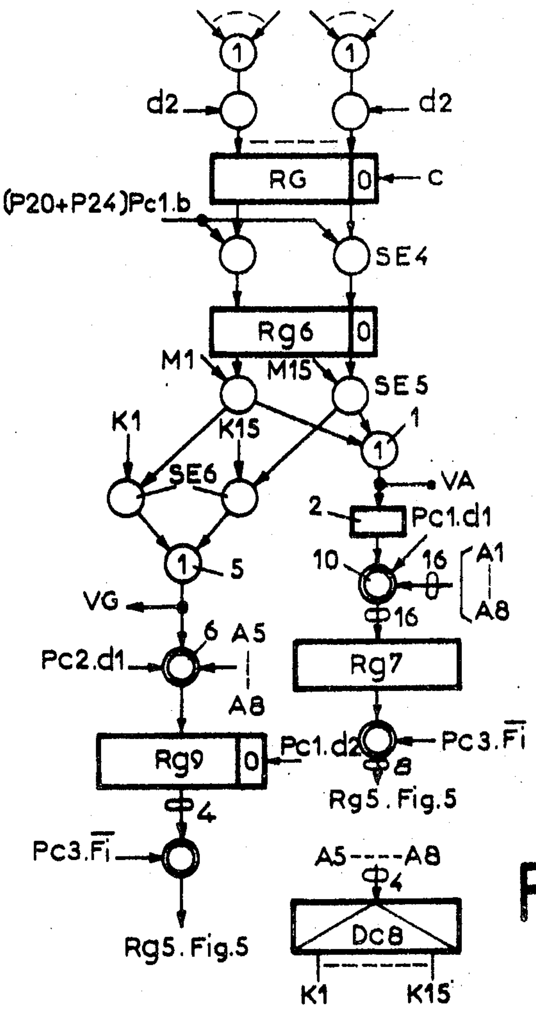
FIG. 8 represents the circuit enabling to find the "-coordinates" of a new call or of a change of state other that a new call.

The information supplied by the circuit of FIG. 7 which come from the scanned supergroup SGu is staticized in the register RG of the circuit of FIG. 8, the said circuit having the role of determining the channel code which has just changed its state and the code of group to which it belongs. The circuit of FIG. 8 has been reduced to elements strictly necessary to the understanding of the scanning. The different phases of a scanning are elaborated by the sequential circuit PC of FIG. 9, the meaning of the said phases and the corresponding code being given by table 2. The operation of this sequential circuit will be described at the same time as the operation of the circuit of FIG. 8.

TABLE 2

| Codes | Phases | Meaning |
|---|---|---|
| 00 | Pc0 | No meaning |
| 10 | Pc1 | Scanning |
| 11 | Pc2 | Choice of the space code |
| 01 | Pc3 | Program completed |

The contents of the register RG (FIG. 8) is transferred at the fine time slot Pc1.*b* in the register R*g*6 through AND circuits SE4. The digits of the register R*g*6 are compared to the digits M1 to M15 of the mask through the AND circuits SE5. If at any time slot *t'x*, a channel changes its state in a group allowed by the mask, one of the AND circuits SE5 is open and supplies a signal VA which, through the OR circuit 1, the inverter circuit 2 and the multiple AND circuit 10 forbids, at the ultra-fine time slot Pc1· d1 the staticizing of the clock code C*t'x* +1 in the register R*g*7; the code *t'x* which is staticized identifies the channel in a group. In order to determine the group of a supergroup which changes their states at the same time slot *t'x*, it is provided a selection circuit comprising the register R*g*9, the decoder Dc8 of the four less significant digits A5 to A8 of the clock codes C*t'*, the AND circuits SE6 the two inputs of which are connected, on the one hand, to the outputs of the AND circuits SE5 and, on the other hand, to the outputs K1 to K15 of the decoder Dc8.

Through the AND circuit 11 (FIG. 9) controlled by the signal Pc1, the output signal VA of the OR circuit 1 (FIG. 8) elaborates the shifting signal to the phase P*c*2 (FIG. 9), phase during which one of the calling groups is selected. When one of the circuits SE6 is open its position and thus the group to which is corresponds are determined by the output K of the decoder D*c*8 which is energized at this instant; the code of group is thus the code of digits A5 to A8 of the clock code at this instant ; the said digits are transferred in the register R*g*9 at the ultra-fine time slot Pc2·*d*1 through the multiple AND circuit 6 controlled by the output signal VG of the OR circuit 5. The signal VG controls also the shifting to the phase Pc3 (condition VG·Pc2·*d*2, FIG. 9). The results of a scanning, vizus the identity of the channel (register R*g*7) and of the group (register R*g*9) are transferred respectively in the flipflops 1 to 8 and 9 to 12 of the register Rg5 (condition Pc3.$\overline{\text{Fi}}$, FIG. 8).

In the case where no channel changes its state in an allowed group, it is foreseen that the duration of the scanning is at least equal to a complete cycle. For this purpose, provision is made for the elaboration of a signal De when a certain clock code C*t'c*, fixed beforehand, is detected during the phase P*c*1 (condition (P20 + P24)·C*t'c*·P*c*1·*d*2, FIG. 9), for the elaboration thereafter of a signal Fi when the code Ct'c appears a second time during the phase P*c*1 (condition (*P*20 + P24)·C*t'c*.P*c*1·D*e*·*d*2, FIG. 9), and for shifting to the final phase P*c*3 if no channel changing its state has been detected (condition P*c*1·$\overline{Fi}$·$\overline{VA}$·*d*2, FIG. 9).

For a scanning of new calls (program P20) or changes of state others that the new calls (program P24), the necessary information are supplied, as it has been mentioned previously, by the circuit of FIG. 5. Thus, the selection of one of the registers R*g*1, R*g*2 or R*g*5 is carried out by the circuit SLR*g*. The logical conditions which supply the selection signals of the registers are given in Table 3.

The circuit of FIG. 5 also supplies the writing signals Y4 to Y7 of the groups of four digits through the circuit SLY the Table 3 of which gives the logical equations. The mask code read in the Memory MRE, the code of the supergroup contained in the counter C*p*SG and the starting code 1 0 0 0 of the sequential circuit of FIG. 9 are supplied by means of the circuit SLM the logical equations of which are also given in Table 3.

The circuit of FIG. 5 is controlled by the data processing machine and receives thus from this latter orders under the form of codes of program the Table 10 of which gives the list as well as their meaning. These codes are transmitted over the conductors H8 to H12 of the group of conductors E*a*1.

When a new call or change of state is detected by the circuit of FIG. 8, the time code and the space code are staticized in the register R*g*5 where they are read out in order to be written in a line of the memory MRE at the same time as the code of the supergroup in course of scanning; these three codes constitute the coordinates of a new call or of an other change of state which may occur between two reading operations of the memory MRE by the data processing machine which controls the switching central exchange.

TABLE 3

Circuits SLRg, SLY and SLM

| Circuits | Signals or digits | Logical equations | Conductors | Group of conductors |
|---|---|---|---|---|
| SLRg | H1 | Sq5 | 1 | E'a1 |
| | H2 | Sq4.Ma | 2 | |
| | H3 | | 3 | |
| | H4 | | 4 | |
| | H5 | Sq6.T + Sq8 | 5 | |
| SLY | Y4 | Sq4.Ma | 1 | E'e |
| | Y5 | Sq5 + Sq4.Ma | 2 | |
| | Y6 | Sq4.Ma | 3 | |
| | Y7 | Sq5 + Sq4.Ma + Sq6.T | 4 | |
| SLM | 1 à 4 | Sq4.Mi.Ma [1] | 1 à 4 | E'a2 |
| | 5 à 8 | Sq4.Mi.Ma + Sq5.DqSG [1 2] | 5 à 8 | |
| | 9 à 12 | Sq4.Mi.Ma [1] | 9 à 12 | |
| | 13 | Sq4.M13.Ma + Sq6 [1] | 13 | |
| | 14, 15 | Sq4.Mi.Ma + Sq5 [1] | 14, 15 | |
| | 16 | Sq5.$\overline{\text{BP}}$ + Sq4.Ma [1] | 16 | |

[1] i Varying from 1 to 15.
[2] q Varying from 1 up to 4.

NOTE: Ma = M1 + M2 + . . . + M15

In the particularly example described, the memory MRE comprises 80 lines, the first 16 ones of which (group MMA) are reserved to the storing of the codes of masks and the 64 other lines are assigned to the scanning results. These 64 last lines are in fact divided into four groups MNA, MCH, MNA', MCH', the groups MNA and MNA' are provided for the storing of the new calls and the groups MCH and MCH' being provided for the storing of the other changes of state. In the course of a scanning, first, the new calls are detected and their coordinates are stored in the part MNA. When this part is filled or when all the supergroups have been scanned, the scanning of the other changes of state is carried out and their coordinates are stored in the part MCH. In the same manner, when this part MCH is filled or when all the supergroups have been scanned, the scanning of the new calls are carried out again and their coordinates are stored in the part MNA'. This circular permutation of the scannings is carried out in a continuous way.

The scanning is stopped upon the request of the data processing machine, either for collecting the results or for carrying out a search or for a path identification, or for any other reason whatsoever. When the data processing machine requests results concerning, either new calls, or the other changes of state, the circuit of FIG. 5 sends the results which are stored in the part of the memory which is not in course of writing.

The choice, on writing and on reading out of one of the memories MNA, MNA', MCH and MCH' is carried out by a circuit LCM which comprises a logical circuit LCM1 the output signals of which control the state of the four flipflops BP, BNA, BCH and BL, the state signals of the said flipflops controlling the selection signals SL of the memory MRE. The Table 4 gives the meaning of the various flipflops of the circuit LCM as well as the logical conditions elaborated by the circuit LCM1 in order to control the states of the said flipflops Table 7 gives the equations of the logical functions carried out by the circuit SL in order to elaborate the signals of the digits MR1 to MR7 of the addressing codes of the memory MRE; the digit MR1 is the most significant digit. In this table, the references c1 to c4 designate digit signals which are supplied continuously.

The different phases of operation of the circuit of FIG. 5 are elaborated by the sequential circuit SQE which comprises a logical circuit LSQE the output signals control the states of the flipflops SQE1 to SQE4, the said states being decoded by the decoder circuit Dc11. Table 5 gives the meaning of the different phases, the corresponding codes and the logical conditions of shifting from one phase to the following one. This Table 5 enables to establish the logical conditions which supply the control signals of the flipflops SQE1 to SQE4, the said logical conditions being given by the table 6.

The writing and reading selection of the lines of one of the memories MNA, MNA', MCH or MCH' are carried out by the counter Cp1 the step signals of which are supplied by the circuit ACpL and the signal of position 1 by the circuit PCpL; the logical equations of the circuits ACpL AND PCpL are given in Table 8.

The reading selection of the lines of the mask memory MMA is carried out by the counter of the supergroup CpSG which supplies the digits MR4 to MR7

TABLE 4

Circuit LCM1

| Flip-flops | States | Meaning | Logical equations |
|---|---|---|---|
| BP | 1 | Scanning is related to new calls (program P20) or requested results are related to new calls (program P32). | $(Sq2+Sq3.\,L16.\,\overline{BCH})d2$ + $(SG15.\,Sq9.\,\overline{BP}+Sq11)d2$ |
| | 0 | Scanning is related to changes of state other than new calls (program P24) or requested results are related to changes of state other than new calls (program P33). | $(Sq3.\,L16.\,\overline{BNA}+Sq14)d2$ + $SG15.\,Sq9.\,BP.\,d2$ |
| BNA | 1 | Coordinates of new calls are stored in MNA (program P31) or requested results are read out of MNA' (program P32). | $(Sq2+Sq3.\,L16.\,\overline{BNA})d2$ + $Sq9.\,\overline{BNA}.\,BP.\,SG15.\,d2$ |
| | 0 | Coordinates of new calls are stored in MNA' (program P31) or requested results are read out of MNA (program P32). | $Sq3.\,L16.\,BNA.\,d2$ + $Sq9.\,BNA.\,BP.\,SG15.\,d2$ |
| BCH | 1 | Coordinates of changes of state other than new calls are stored in MCH (program P31) or requested results are read out of MCH' (program P33). | $(Sq2\ \ Sq3.\,L16.\,\overline{BCH}).\,d2$ + $Sq9.\,\overline{BCH}.\,\overline{BP}.\,SG15.\,d2$ |
| | 0 | Coordinates of changes of state other than new calls are stored in MCH' (program P31) or requested results are read out of MCH (program P33). | $Sq3.\,L16.\,BCH.\,d2$ + $Sq9.\,BCH.\,\overline{BP}.\,SG15.\,d2$ |
| BLgg | 1 | Coordinates of new calls and other changes are stored in MNA and MCH for the first time and requested results must be read out of MNA and MCH. | $Sq3.\,d2$ |
| | 0 | MNA and MCH memories have been stored a first time and requested results must be read out of memories identified by states of BP, BNA snd BCH flipflops. | $Sq9.\,\overline{BP}.\,SC15.\,d2$ |

TABLE 5

| Phases | SQ1 SQ2 | SQ3 SQ4 | | | Meaning | Conditions |
|---|---|---|---|---|---|---|
| Sq0 | 0 | 0 | 0 | 0 | Freedom | (Sq1+Sq3.P34)d2 |
| Sq1 | 0 | 0 | 0 | 1 | Writing of a mask | P35.d2 |
| Sq2 | 0 | 0 | 1 | 1 | Clear of flipflops and counters | (Sq0 +Sq13)P31.d2 |
| Sq3 | 0 | 0 | 1 | 0 | Clear of the result memory | Sq2.d2 |
| Sq4 | 0 | 1 | 1 | 0 | Send of a mask and AR digit | (Sq3.$\overline{BP}$.$\overline{BCH}$.L16+Sq9)$\overline{P}$.d2+Sq10.P31.d2 |
| Sq5 | 0 | 1 | 0 | 0 | Send of program and supergroup codes | Sq4.Ma.$\overline{P}$.d2 |
| Sq6 | 1 | 1 | 0 | 0 | Send starting code | (Sq5+Sq8.$\overline{t'dx}$.$\overline{L16}$)$\overline{P}$.d2 |
| Sq7 | 1 | 1 | 0 | 1 | Wait result | Sq6.T.$\overline{P}$.d2 |
| Sq8 | 0 | 1 | 0 | 1 | Recept a result | Sq7.AR'.$\overline{P}$.d2 |
| Sq9 | 0 | 1 | 1 | 1 | End of scanning of a super-group | (Sq4.$\overline{Ma}$+Sq7.td+2.BT.Pcl)$\overline{P}$.d2+Sq8(t'dx+L16)$\overline{P}$.d2 |
| Sq10 | 1 | 1 | 1 | 0 | Pause | P34.$\overline{Sq0+Sq3+Sq13}$.d2 |
| Sq11 | 1 | 0 | 1 | 0 | First occurrence of program P32 | P32($\overline{Sq13}$+$\overline{BP}$).d2 |
| Sq12 | 1 | 0 | 0 | 1 | Send of result towards computer | Sq13(P32.BP+P33.$\overline{BP}$).d2 |
| Sq13 | 1 | 0 | 1 | 1 | Wait request of result | (Sq11+Sq12+Sq14).d2 |
| Sq14 | 1 | 1 | 1 | 1 | First occurrence of program P23 | P33($\overline{Sq13}$+$\overline{BP}$).d2 |

NOTE: P=P32+P33+P34+P35.

TABLE 6

Circuit LSQE

| Digits | Logical equations |
|---|---|
| SQ4 | [P35+$\overline{P}$(Sq6.T+Sq4.$\overline{Ma}$)+P31.Sq0+P33.$\overline{Sq13}$+Sq11]d2 |
| $\overline{SQ4}$ | [$\overline{P}$(Sq8.$\overline{L16}$.$\overline{t'dx}$+Sq9)+P34.$\overline{Sq0+Sq3+Sq13}$+P32($\overline{Sq13}$+$\overline{BP}$) d2+(Sq1+Sq2)d2 |
| SQ3 | [P31.Sq0+P34.$\overline{Sq0+Sq3+Sq13}$+BT.$\overline{P}$]d2+[$\overline{Sq13}$(P32+P34)+ Sq12+$\overline{P}$.Sq8(tdx+L16)]d2 |
| $\overline{SQ3}$ | [P35+P34.Sq3+$\overline{P}$.Sq4.Ma+Sq13(P32.BP+P33.$\overline{BP}$)]d2 |
| SQ2 | [Sq3.$\overline{BP}$.$\overline{BCH}$.L16.$\overline{P}$+P34.$\overline{Sq0+Sq3+Sq13}$+P33($\overline{Sq13}$+BP)] d2 |
| $\overline{SQ2}$ | [P35+P32.$\overline{Sq13}$+Sq14]d2 |
| SQ1 | [$\overline{P}$(Sq5+Sq8.$\overline{L16}$.$\overline{t'dx}$)+P34.$\overline{Sq0+Sq3+Sq13}$+$\overline{Sq13}$(P32+P33)] d2 |
| $\overline{SQ1}$ | [P35+P31(Sq10+Sq13)+P(Sq7.AR'+BT)]d2 |

TABLE 7

Circuit SL

| Digits | Logical equations |
|---|---|
| MR1 | (Sq1+Sq4)c1+(Sq3+Sq8+Sq12)c4 |
| MR2 | (Sq1+Sq4)c2+(Sq3+Sq8+Sq12)BP |
| MR3 | (Sq1+Sq4)c3+(BNA.BP+BCH.$\overline{BP}$)(Sq8+Sq3)+BL.Sq12 +BNA.BP+BCH.$\overline{BP}$.$\overline{BL}$ Sq12 |
| MR4 | Sq1.RLM1+Sq4.D1SG+(Sq3+Sq8+Sq12)CpL1 |
| MR5 | Sq1.RLM2+Sq4.D2SG+(Sq3+Sq8+Sq12)CpL2 |
| MR6 | Sq1.RLM3+Sq4.D3SG+(Sq3+Sq8+Sq12)CpL3 |
| MR7 | Sq1.RLM4+Sq4.D4SG+(Sq3+Sq8+Sq12)CpL4 |

of the selection code ; the selection of the memory MMA is obtained by a pre-wired three-digit code (signals c1 to c3 of the table 7), this pre-wired code is also used f for the writing selection of the memory MMA and it is then combined with the four-digit code contained in the register RLM and supplied by the data processing machine. This pre-wired code is conditioned by the phase signal Sq1 for the writing of a mask and the phase signal Sq4 for the reading of a mask (Table 7).

The writing in the memory MRE is carried out by means of a circuit WRE which receives either the mask codes coming from the data processing machine or the "coordinates" of the changes coming from the register Rg5 of FIG. 6 and from the supergroup counter CpSG (FIG. 5). Table 9 summarizes the logical conditions of the writing.

It has been mentioned previously that the data processing machine could interrupt a scanning; the circuit of FIG. 5 is then provided for starting again this scanning at the place where it has been interrupted if the interruption is due to the program P34 (pause—Table 10). After a send of results (programs P32 and P33), the scanning starts again at the initial state, i.e., at the first supergroup SG1 and at the first line L1 of the memory MNA provided the signal of the scanning program P31 is received.

The start of a scanning at its preceding state is obtained by the circuit REA. This circuit REA is also foreseen for limiting the scanning of a supergroup to a complete cycle of $g = 192$ different clock codes as well as for collecting the "coordinates" of a new call or of a change of state if it occurs during the last time slot of the cycle. The circuit REA comprises mainly a register Rg11 in which is staticized the time code Ct'x of the result contained in the positions 1 to 8 of the register Rg5 of FIG. 6, a comparator C''p receiving, on the one hand, the clock codes Ct' and, on the other hand, the code Ct'x of the register Rg11, a decoder Dc12 which supplies a signal t'd when the code Ct' is equal to the code Ct'd, a decoder Dc13 which supplies a signal t'dx when the code Ct'x is equal to the code Ct'd, a decoder Dc14 which supplies a signal t'd+2 when the code Ct' is equal to the code Ct'd+2, a flipflop BTD the 1 state of which means that the scanning must start again at the clock time slot t'd and the 0 state means that the scanning must start again at the time slot t'x, a flipflop BT which is set when the clock code Ct' is equal to Ct'd during the presence of a signal Sq7. The operation of this circuit will be described during the scanning program P34.

The operation of the circuit of FIG. 5 during the different programs P31 to P34 will be now described. The Table 10 gives the meaning of the different programs and the list of the codes used, the said codes being decoded by the decoder circuit Dc10. The first digit of the program code is a 1 digit when the writing of a mask is carried out, it is a 0 digit when another program is performed.

Writing of a mask — program P35

The writing of a mask is carried out in two steps. In a first step (synchronous time slot tS), the computer sends, over the group of conductors Ea1, a 1 digit over one of the conductor H1 to H5, a 1 digit over the conductor H8 in order to indicate that a mask is dealt with (program P35), the code of the supergroup to which the mask corresponds over the conductors H9 to H12. The conductors H1 to H5 constitute the inputs of the OR circuit 13 the output signal Ha of which controls the flipflop BH, the code of the supergroup is staticized in the register RLM through the multiple AND circuit 12 controlled by the signal which is present over the

TABLE 8

Counter CpL

| Circuits | Logical equations |
| --- | --- |
| ACpL | $[Sq3+(Sq8+Sq12)\overline{L16}]d2$ |
| PCpL | (Sq2+Sq11+Sq14+Sq9.SG15)a |

TABLE 9

Circuit WRE

| Digits | State | Logical equations | i | j | q | r | z |
| --- | --- | --- | --- | --- | --- | --- | --- |
| 1 à 8 | 1 | (Sq1.Yj.Mi+Sq8.Drt'x)d2 | 1 à 8 | 4,5 | | 1 à 8 | |
| | 0 | $(Sq1.Yj.\overline{Mi}+Sq8.\overline{Drt'x}+Sq3)d2$ | 1 à 8 | 4,5 | | 1 à 8 | |
| 9 à 12 | 1 | (Sq1.Yj.Mi+Sq8.DzG)d2 | 9 à 12 | 6 | | | 1 à 4 |
| | 0 | $(Sq1.Yj.\overline{Mi}+Sq8.\overline{DzG}+Sq3)d2$ | 9 à 12 | 6 | | | 1 à 4 |
| 13 à 15 | 1 | (Sq1.Yj.Mi+Sq8.DqSG)d2 | 13 à 15 | 7 | 1 à 3 | | |
| | 0 | $(Sq1+Yj.\overline{Mi}+Sq8.\overline{DqSG}+Sq3)d2$ | 13 à 15 | 7 | 1 à 3 | | |
| 16 | 1 | Sq8.DqSG.d2 | | | 4 | | |
| | 0 | (Sq8.DqSG+Sq3)d2 | | | 4 | | |

TABLE 10

Programs

| Programs | Codes | | | | | Meaning |
| --- | --- | --- | --- | --- | --- | --- |
| | H8 | H9 | H10 | H11 | H12 | |
| P31 | 0 | 0 | 0 | 0 | 1 | Start order of a scanning. |
| P32 | 0 | 0 | 0 | 1 | 0 | Request of results relating new calls. |
| P33 | 0 | 0 | 0 | 1 | 1 | Request of results relating to other changes. |
| P34 | 0 | 0 | 1 | 0 | 0 | Pause. |
| P35 | 1 | x | x | x | x | Writing of a mask. |

conductor H8; the signal P35 shifts the sequential circuit in the phase Sq1 (Table 5). In a second step (asynchronous following time slot tA), the data processing machine sends the code of mask which is stored in the memory MRE through the writing circuit WRE which achieves the logical conditions *Sq*1·*Yj*·*Mi*·*d* 2 and *Sq*1·*Yj* ·$\overline{Mi}$·*d*2 of table 9, *j* varying from 4 up to 7 and *i* varying from 1 up to 15).

If several mask codes must be stored, the operations described hereabove are repeated as many times as it is necessary. After the writing of each mask, the sequential comes back to the phase *Sq*O (condition *Sq*1·*d*2, table 5).

Program P31

This program is intended for scanning the new calls and the other changes of state. For this scanning, the circuit of FIG. 5 receives, over the group of conductors Ea1, a code "1 out of 5" over the conductors H1 to H5, the 0 digit over the conductor H8 in order to indicate that a program is performed, the program code over the conductors H9 to H12. These digits H9 to H12 are decoded by the decoder Dc10 which supplies a signal P31; this signal P31 controls the shifting of the sequential circuit from the phase *Sq*0 or *Sq*13 to the phase *Sq*2 (condition (*Sq*0 + *Sq*13) P31·d2, Table 5). This phase *Sq*2 is a phase of reset to the initial state, for instance to the 1 state, of the flipflops BP, BNA, BCH of the circuit LCM (condition Sq2·d2, Table 4), of the flipflop BTD of the circuit REA (condition Sq2·d2, FIG. 5); besides, the line counter CpL and the supergroup counter CpSg are set in such a way that their codes correspond respectively to the first line and to the first supergroup (condition Sq2·*a* of Table 8 and FIG. 5).

As it has been mentioned previously, a scanning may be interrupted by a signal P34 at any time slot *t'x* of a cycle and may be resumed at the time slot *t'x* of another cycle. Besides, before shifting to the scanning of the following supergroup, one must be sure that the *g* = 192 channels of each group of supergroup, have been scanned and, for this purpose, provision has been made for starting a scanning of a supergroup at a time slot *t'd* (clock code Ct'*d*) and to shift to the scanning of the following supergroup only when a new code Ct'*d* has been detected again. As the operations of starting of scanning and of resuming of scanning are similar, it is convenient to store the fact that it is necessary to start either at the time slot *t'd* or at the time slot *t'x;* it is the role of the flipflop BTD of the circuit REA of FIG. 5. The 1 state of this flipflop BTD means thus that the scanning will start at the time slot *t'd*.

The following phase is the phase *Sq*3 (conditions *Sq*2·d2, Table 5) which is a phase of clearing the result memories MNA, MCH, MNA', MCH'. The lines of these memories are selected successively through a line counter *C*pL (condition Sq3·*d*2, Table 8) and zeros are written in each line (condition *Sq*3·*d*2 Table 9). On the other hand, there is shifting from a memory to the following one for the logical conditions, comprising the signal Sq3, applied to the flipflops BP, BNA, BCH (Table 4). Thus, there is shifting from the clearing of the memory MNA to the clearing of the memory MNA' by resetting the flipflop BNA (conditions *Sq*3·L16·BNA·*d*2); the state signals of the flipflops BP and BNA define then the two digits MR2 and MR3 of the addressing codes of the memory MRE conditions BP·Sq3 and (BNA·BP+ BCH·$\overline{BP}$) *Sq*3, table 7. During the phase Sq3, the flipflop BL is set (condition *Sq*3· *d*2, Table 4).

When the last line L16 of the memory MCH' has been cleared (condition *Sq*3·$\overline{BP}$·$\overline{BCH}$·L16·$\overline{P}$·*d*2, Table 5), there is shifting to the phase *Sq*4 during which a mask code and the digit of interruption AR are sent. The shifting to the phase *Sq*4 is also conditioned by the signal $\overline{P} = \overline{P32 + P33 + P34 + P35}$ which means that none of the signals P32, P33, P34 or P35 is present, and that a scanning is running. As the supergroup counter *C*pSG is in the position SG1 (condition *Sq*2·*a*, FIG. 5), the line 1 of the memory MMA is selected and the mask code is sent towards the register R*g*2 of FIG. 6 through the circuit SLM (FIG. 5), Table 3 of which gives the logical equations (conditions Sq4· Mi·Ma of the 15 digits of mask). At the same time, the signal of selection of the register Rg2 (FIG. 6) (condition Sq 4·M*a*, Table 3) as well as the writing signals Y*j* of the four parts of the word (conditions S*q*4·M*a*, Table 3) are sent. It will be noticed that the mask code is a 1 (condition M*a*) because it is not necessary to carry out a scanning if all the groups are forbidden. In the case where the signal Ma does not appear, the sequential shifts to the phase S*q*9 (condition S*q*4·$\overline{Ma}$· $\overline{P}$, Table 5) the signals of which steps up by one position the counter CpSG (condition S*q*9·*d*2, FIG. 5); afterwards there is coming back to the phase S*q*4 (condition S*q*9·$\overline{P}$·*d*2, Table 5) for sending the mask code of the supergroup SG2. The 16 digit AR to be sent is elaborated by the condition S*q*4·M*a* and enables to warn the circuit of FIG. 5 of the presence of a result (signal AR′ =AR·P*c*3, FIG. 6).

If one of the digits of the mask code is a 1, there is shifting to the following phase S*q*5 (condition S*q*4·M*a*· $\overline{P}$) during which the codes of the supergroup CSG and the one of the program P20 or P24 are set. These two codes are staticized in the register R*g*l (FIG. 6) selected by the signal S*q*5 (Table 3) applied to the first conductor of the group of conductors E′*a*l ; the code CSG corresponds to the digits 5 to 8 of the register Rgl and is elaborated by the conditions S*q*5·DqSG of Table 3, D*q* designating the digits of the code CSG. The program code corresponds to the digits 13 to 16 of the register R*g*l; as the codes of P20 to P24 are respectively 0 1 1 0 and 0 1 1 1, the digits 14 and 15 will be elaborated by the signal S*q*5 and the digit 16 of P24 by the condition S*q*5·$\overline{\mathbf{BP}}$.

Figure 9:
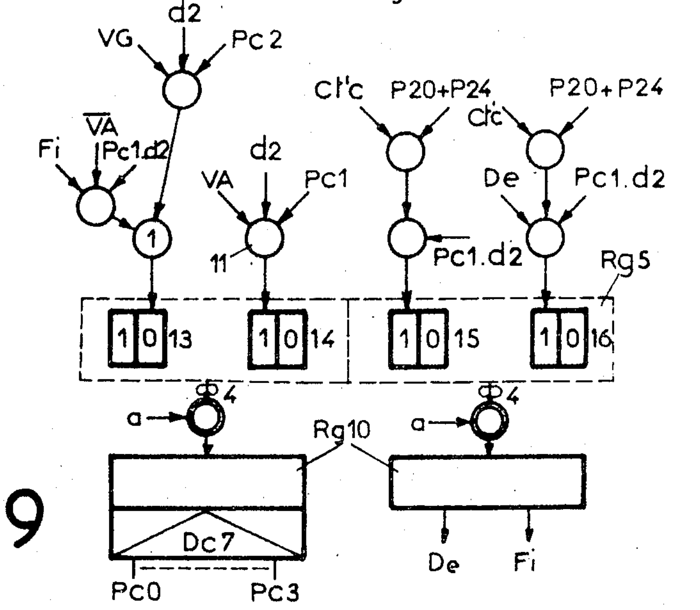
FIG. 9 represents the sequential control circuit of the different phases of the circuit of FIG. 8.

Afterwards, there is shifting to the phase Sq6 (condition S*q*5·$\overline{P}$·*d*2, Table 5) during which the starting code CPcl (code 1 0 0 0) is sent to the sequential circuit of FIG. 9. This code, the 1 digit of which is elaborated by the signal S*q*6 (table 3) is staticized in the positions 13 to 16 of the register R*g*5 (FIG. 6) by the selection signal S*q*6·T (circuit SLR*g*, Table 3) of the said register and of the selection signal Y7 = S*q*6·T of the digits 13 to 16 (circuit SLY, Table 3). The signal T supplied by the circuit REA indicates that the clock code C*t*′ is either C*t*′*d* in the case of the beginning of a scanning or C*t*′*x* in the case of an interrupted scanning.

As soon as the signal T appears, one shifts to the phase S*q*7 (condition S*q*6·T·$\overline{P}$·*d*2, Table 5) which is a waiting phase of a result of the scanning in course. As soon as a new call or a change of state is detected (signal AR′), one shifts to the phase S*q*8 (condition S*q*7·AR′·$\overline{P}$·d2, Table 5) during which the time code C*t*′*x* (conditions S*q*8·D*rt*′*x* ·*d*2 and S*q*8·$\overline{Drt'x}$·*d*2, Table 9, *r* varying from 1 up to 8), the code of group CG (conditions S*q*8.DzG.*d*2 and S*q*8·$\overline{DzG}$·*d*2, Table 9, *z* varying from 1 up to 4), the code of the supergroup CSG (conditions S*q*8.DgSG.*d*2 and S*q*8·$\overline{DqSG}$ ·*d*2, Table 9, *q* varying from 1 up to 4 are stored.

If the code .*t*′*x* is not equal to the code C*t*′*d* (signal $\overline{t'dx}$) and if the line written is not the line 16 (signal $\overline{\mathbf{L16}}$), the scanning is run on by shifting to the phase S*q*6 during which the code CpC1 is sent (condition S*q*8·$\overline{t'dx}$·$\overline{L16}$·$\overline{P}$·*d*2, Table 5). On the contrary, if this is not the case, one shifts to the phase S*q*9 (condition S*q*8($t' < \gamma\nu +$L 16)P·*d*2, Table 5), which means that a supergroup has been completely scanned or that the memory in the course of writing is filled. One shifts also to the phase S*q*9, if, being in phase S*q*7 of waiting of a result, the time code C*t*′*d*+2 is detected after a complete scanning cycle of the channels whereas the sequential circuit of FIG. 9 is in the phase Pc1. This condition Sq7·*t*′*d*+2·Pc1·$\overline{P}$·d2, (Table 5) means that the supergroup has been completely scanned, since the signal *t*′*d*+2 is decoded after having detected the second occurrence of the time code *t*′*d* and that there is no result (phase Pc1 of the sequential of the FIG. 9). The code C*t*′*d*+2 is decoded and not the signal C*t*′*d* in order to take into account the fact that if a change is detected at a time slot *t*′*d* (signal VA, FIG. 8), the signal AR′= AR·P*c*3 earliest appears at the time slot *t*′*d*+2 so that if, at the time slot *t*′*d*+2, the phase P*c*1 is running, there is no interest of waiting a result and the scanning may be considered as completed.

It will be noticed that the scanning cycle of all the channels of a supergroup is defined by two successive detections of the time code C*t*′*d* : the first detection is obtained by the condition S*q*6·T·$\overline{P}$, the signal of which resets the flipflop BT and the second condition is obtained by the condition S*q*7·*t*′*d* the signal of which sets the flipflop BT.

The phase signal Sq9 is used for setting the flipflop BTD in order to start the new scanning at the time slot *t*′*d*, for stepping up the counter of the supergroup CpSG in order to address the following supergroup and to come back to the phase S*q*4 (condition S*q*9·$\overline{P}$·*d*2, Table 5). If the supergroup which has just been scanned is the last one SG15, one shifts to another scanning program, vizus the program mP20 if the preceding program was P24 (condition SG15·S*q*9·$\overline{\mathbf{BP}}$·*d*2, flipflop BP, Table 4) or the program P24 if the preceding program was the program P20 (condition SG15·S*q*9b5.BP·*d*2, flipflop BP, Table 4) or the program P24 if the preceding program was the program P20 (condition SG15·S*q*9·BP·*d*2, flipflop BP, Table 4). The signal SG15 changes also the state of one of the flipflops BNA and MCH in order that the results of the following scanning may be stored in the memory provided for this purpose (condition with S*q*9·SG15 of the Table 4). Besides, if the scanning program which has just been completed was a program P24 (signal $\overline{\mathbf{BP}}$), the flipflop BL is reset which means that the results will have to be read in the memory indicated by the flipflops BP, BNA and BCH.

The preceding explanations have shown that the scanning could be carried on without interruption by shifting alternatively from the program P20 to the program P24, from the memory MNA of the memory MCH, then to the memory MNA′, last to the memory MCH′ and again the memory MNA.

Program P34

The program signal P34 is intended for interrupting a scanning (condition P34.$\overline{\mathbf{Sq0}+\mathbf{Sq3}+\mathbf{Sq13}}$·*d*2, Table 5) and one shifts then to the phase S*q*10 ; the scanning is started again from the phase S*q*4 if the data processing machine sends the program P31.

Program P32

This program enables the data processing machine to collect the results concerning the new calls, the said results being stored in the memories MNA and MNA'. These results are transferred through a group of sixteen conductors E*b* (FIGS. 5 and 6), the said group being used also for the transfer of other results such as those defined in the case (c). The sequential circuit shifts to the phase S*q*11 which means that the program P32 is requested for the first time. The signal S*q*11 sets in the position L the line counter C*p*L (condition S*q*11·*a*, Table 8) in order to read the result stored in the first line of one of the memories MNA or MNA' according to the state of the flipflops BNA and BCH ; it sets also the flipflop BP in order to address the memories MNA and MNA'.

The sequential circuit shifts then to the phase Sq13 which means that the circuit is ready to send a result if the data processing machine sends an instruction. In this instruction of request of result, one of the digits H1 to H5 is a 1 and the digits H8 to H12 give the code of the program P32. This instruction is repeated for reading each line of the one of the memories MNA or MNA'. On reception of this instruction, the sequential shifts in S*q*12 (condition S*q*13·P32·BP·*d*2, Table 5), thus enabling the sending of the content of the selected line towards the data processing machine (FIG. 5). The line counter is stepped up by one position by the signal S*q*12 if the selected line is not the line 16 (condition S*q*12·$\overline{\text{L16}}$·d2, table 8) if the selected line is the line 16, the line counter C*p*L does not step up so that the line 16 is continuously addressed, the said line being then read each time the signal P32 appears. The signal S*q*12 also permits the shifting to the phase S*q* 13 (condition S*q*12.*d*2, Table 5).

Program P33

This program enables the data processing machine to collect the results concerning the changes others that the new calls, the said results being stored in the memories MCH and MCH'. The operation of the circuit of FIG. 5 in the case of this program P33 is similar to the one described in relation with the program P32 with the difference that the phase S*q*11 is replaced by the phase S*q*14.

It will be noticed that one shifts to the phase S*q*11 for the condition P32·$\overline{\text{BP}}$·*d*2 and to the phase S*q*14 for the condition P33·$\overline{\text{BP}}$·*d*2, these conditions are necessary to take into account the fact that one may receive, for instance, the signal P32 during the phase S*q*13 whereas the flipflop BP is in the 0 state and address then the memories MCH and MCH', the said memories not being those which are to be read out.

In FIG. 5, the signals of programs P32 and P33 are conditioned by the signal H*a*·BH, the signal Ha meaning that one of the digits H1 to H5 is a 1 and the flipflop BH changing its state at each occurence of the signal Ha. Through this circuit, the signal Ha·BH appears twice less often than the signals H1 to H5, which achieves then a division by two of the signals of the programs P32 and P33. This division by two is required by the sending mode of the instructions; in fact, an instruction comprises always two parts, the first one corresponding to a writing operation and the second one corresponding to a reading operation, each one of these two parts comprising a synchronous time slot during which the addressing information is sent (in particular the digits H1 to H5) and an asynchronous time slot during which the reading or writing operations have actually carried out. In the case of the programs P32 and P33, this would be equivalent to sending twice the code of the program and thus to step up the line counter by two steps instead of one, therefore, the signals P32 and P33 are made active every two times by conditioning them by the signal H*a*·BH.

Besides, for reasons of synchronization between the data processing machine and the circuits which it controls, it is always the second part of the instruction, i.e., the reading instruction which is set first, and it is necessary then for the flipflop BH to be in the 1 state at the beginning of the programs P32 and P33 ; this 1 state is obtained by the signal Sq0·*b*; it is the same after a pause (phase S*q*10) and the 1 state is obtained by the signal S*q*10·*b*.

Figure 10:
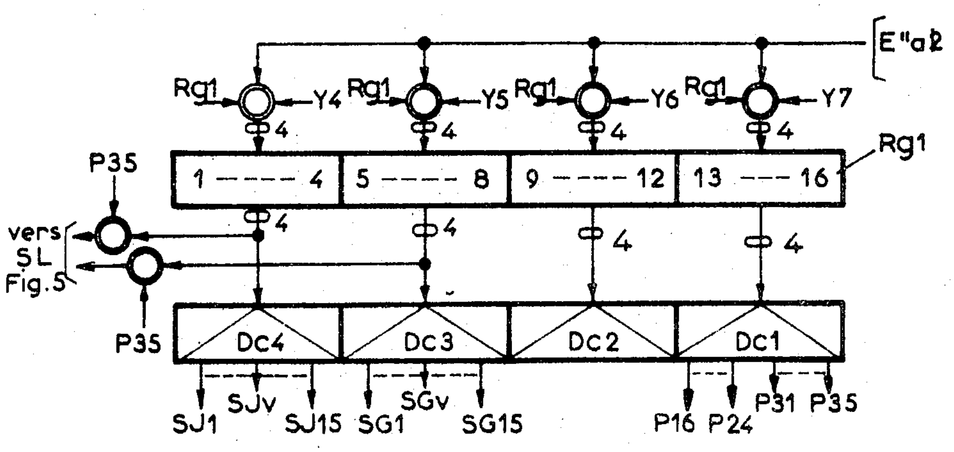
FIG. 10 represents another embodiment of the circuits provided for receiving the information coming from the data processing machine.

In the circuits described, the scanning circuits themselves (FIGS. 6, 7, 8 and 9) which are in fact common to the path search circuits [case (c)] are controlled by the circuits described in relation with FIG. 5, the said control circuits receiving directly the instructions coming from the data processing machine through the groups of conductors E*a*1 and E*a*2 (FIG. 5) which are connected to the decoder D*c*10, to the register RLM and to the circuit WRE. It is possible to provide for other ways of access of the data processing machine, in particular, the decoder D*c*10 and the register RLM may be replaced by the decoder D*c*1 and the register R*g*1 fo FIG. 6; besides, it is possible to provide for a direct access from the data processing machine to the memory MRE (FIG. 5), this possibility enabling to carry out checking operations either during the debugging or the equipment of during the normal operation. FIG. 10 represents the register R*g*1 of FIG. 6 to which is associated a certain number of circuits in order to use it as input circuits of the circuit of FIG. 5. Thus, the words to write are always supplied by the group of conductors E''*a*2, but in the case of a direct access to the memory MRE (program P35) either for a reading out operation or for a writing operation, the digits 1 to 8 constitute the address code which is set to a selection circuit SL (FIG. 5). The choice between the writing operations and the reading out operation is obtained through the signals Y4 to Y7 (parts of words) present over the group of conductors E*e*. If one of the signals Y4 to Y7 corresponds to a writing operation in a register, a writing operation in the memory MRE will be involved and if none of the signals Y4 to Y7 to correspond to a writing operation in a register, a reading out operation of the memory MRE will be involved.

The circuit which enables to determine the coordinates of a change of state (FIG. 8) can determine the coordinates of only one single new call or other changes of state among the new calls or other changes of state which may occur in the 15 channels of the same rank of a supergroup, this being due to the fact that only the signal VG (FIG. 8) which appears the first time during the decoding of the digits A5 to A8 of the clock code C*t*' by the decoder circuit D*c*8 is taken into account. Such a mode of operation is acceptable only if the supergroups are frequently scanned and if the memory MRE is read at close intervals, these two conditions depending upon the size and the traffic of the central exchange. The efficiency of the scanning of the supergroups may be improved by making provision for the detection of all the new calls or other changes of state appearing in the channels of the same rank of a supergroup ; this is obtained by associating to the decoder Dc8 (FIG. 8) a four-digit counter called group counter ; the digits of the codes of this counter replace then the digits A5 to A8 of the clock Ct'.

For safety reasons of operation of the central exchange, provision is made for using two circuits objects of the present invention, these two circuits may then operate according to several different ways, vizus:

1° One of the circuits is used for carrying out the scanning whereas the other one is used for carrying out the checkings;

2° the circuits scan each one on turn;

3° The two circuits work in parallel and provision is made for comparing the results obtained.

While the principles of the above invention have been described in connection with specific embodiments and particular modifications thereof, it is to be clearly understood that this description is made by way of example and not as a limitation of the scope of the invention.

We claim:

1. A time division multiplex data switching system controlled by a central data processing machine, the said switching system comprising a switching network, a plurality of inlets connected to a first plurality of junctors for coupling a group of trunks to the switching network, said first plurality of junctors including means for making a series-parallel conversion of signals received over a first plurality of the inlets, means coupled to make a parallel-series conversion of signals from the switching network to a second plurality of inlets, said junctors including circuits for detection and interpretation of the signals received over said first plurality of inlets, said junctors each including a signalling memory circuit in which are stored for each channel of a group of signals the expected signalling state and the indication of change or of the lack of change of state of signalling with respect to the expected state, a second plurality of junctors connected to outlets of the switching network, each of said second plurality of junctors including four memories including a data memory, a time path memory and two space path memories intended for establishing a connection between two channels, means coupling said memories to be updated by the data processing machine in relation to the communications in course, a clock circuit for supplying cyclic signals, circuits associated with said signalling memories to enable detection each time the channels processed receive a call or change their states, a sequential circuit enabling the determination of the time and space coordinates of a calling channel or of a channel changing its state, said sequential circuit including means for scanning for new calls and other changes of state and means for first determining the coordinates of the calling channels and in storing them in a first memory, means for determining thereafter the coordinates of the channels changing their states and in storing them in a second memory, means for scanning once again the new calls and means for writing their coordinates in a third memory, means for scanning once more the other changes of state and means for writing their coordinates in a fourth memory, and means for starting again the operations described hereabove in the same order.

2. A data switching central exchange according to claim 1 including means by which the coordinates of the new calls or of the other changes of state contained in the memory are transmitted towards the data processing machine upon the request of this latter.

3. A data switching central exchange according to claim 1 in which the scanning may be interrupted at a time slot by the data processing machine and re-started at the same time slot t'x of another cycle.

4. A data central exchange according to claim 1, including means transmitting coordinates towards the data processing machine, after which scanning concerns once again the new calls the coordinates of which are stored in the first memory.

5. A data switching central exchange according to claim 1, including masks employing codes which enable the masks to take into account new calls and other changes of state coming from certain groups of channels which are supplied by the data processing machine and are written in a fifth memory.

* * * * *